United States Patent [19]

Yost, Jr.

[11] E Re. 29,085

[45] Reissued Dec. 21, 1976

[54] SPECTRAL-ZONAL COLOR RECONNAISSANCE SYSTEM

[75] Inventor: Edward F. Yost, Jr., Northport, N.Y.

[73] Assignee: Spectral Data Corporation, Hauppauge, N.Y.

[22] Filed: Oct. 29, 1974

[21] Appl. No.: 518,393

Related U.S. Patent Documents

Reissue of:

[64] Patent No.: 3,715,962
Issued: Feb. 13, 1973
Appl. No.: 30,199
Filed: Apr. 20, 1970

U.S. Applications:

[63] Continuation of Ser. No. 519,854, Jan. 11, 1966, abandoned.

[52] U.S. Cl. ..... 354/68; 353/31; 354/78; 354/103; 355/37

[51] Int. Cl.[2] ..... G03B 39/00; G03B 21/00

[58] Field of Search ..... 354/102; 355/32, 37; 353/31

[56] References Cited

UNITED STATES PATENTS

| | | | |
|---|---|---|---|
| 2,317,612 | 4/1943 | Huebner | 355/32 |
| 2,352,914 | 7/1944 | Rackett | 355/37 |
| 2,553,285 | 5/1951 | Thomas | 355/37 |
| 2,600,590 | 6/1952 | Thomas | 354/102 |
| 2,945,413 | 7/1960 | Kelly | 350/166 |
| 2,981,791 | 4/1961 | Dixon | 355/37 X |
| 3,322,025 | 5/1967 | Dauser | 355/35 X |
| 3,392,645 | 7/1968 | Neasham | 354/68 X |

*Primary Examiner*—John Gonzales
*Attorney, Agent, or Firm*—Eliot S. Gerber

[57] ABSTRACT

Multiple images of a common scene are formed by exposure of photographic film primarily to separated zones of the actinic electromagnetic spectrum. The several film images are illuminated individually with lights of selected chromaticities. The chromaticity of the light illuminating at least one of the images is widely separated from the chromaticity associated with the corresponding exposing spectral zone for that image. The illuminated images are displayed in registration for evaluation.

10 Claims, 2 Drawing Figures

SPECTRAL-ZONAL COLOR RECONNAISSANCE SYSTEM

Figure 1:
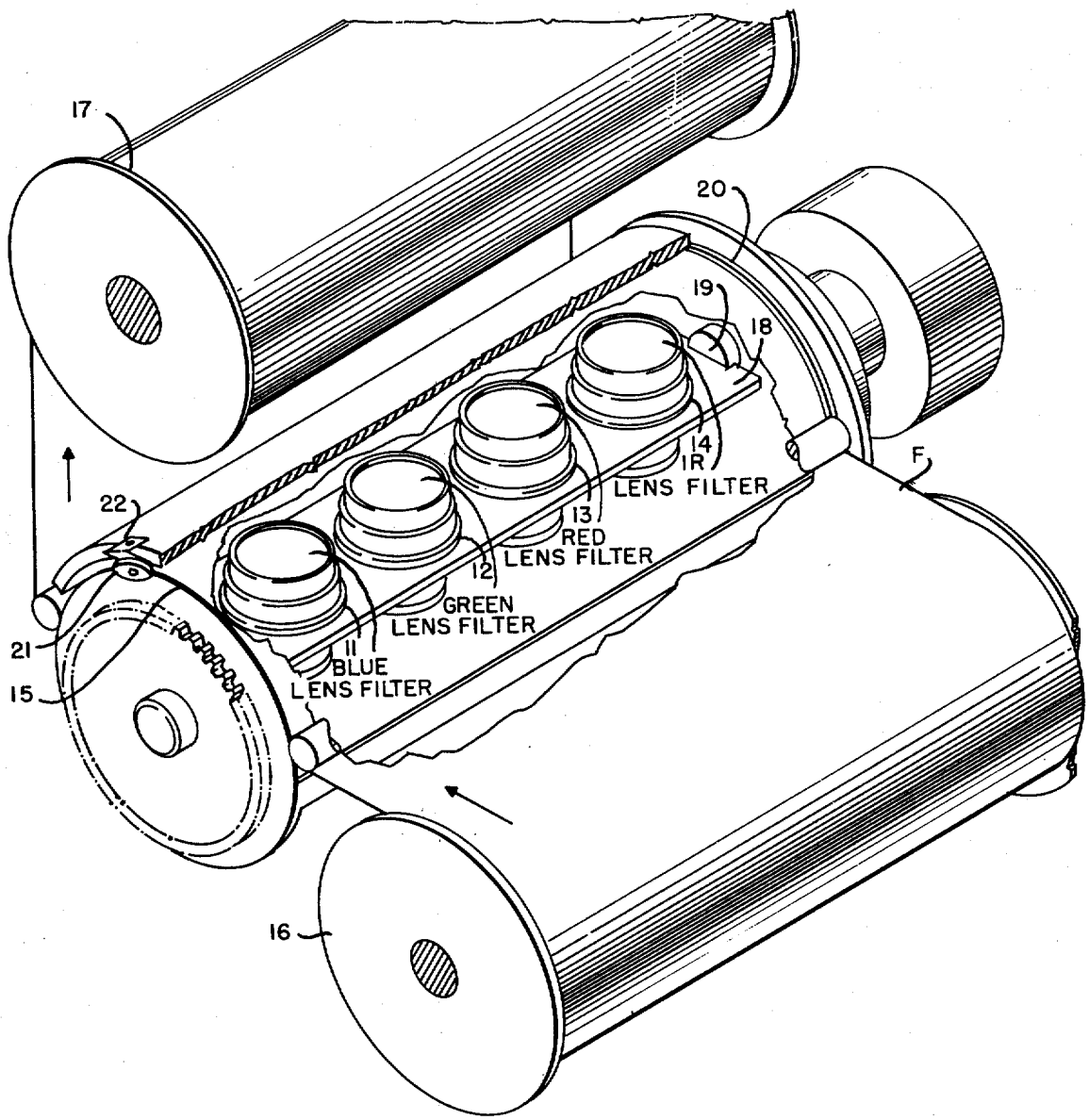

Matter enclosed in heavy brackets [ ] appears in the original patent but forms no part of this reissue specification; matter printed in italics indicates the additions made by reissue.

CROSS REFERENCE TO RELATED APPLICATION

This is a continuation of copending application Ser. No. 519,854, filed Jan. 11, 1966, for "SPECTRAL-ZONAL COLOR RECONNAISSANCE SYSTEM", now abandoned.

This invention relates to spectral-zonal color reconnaissance systems and particularly to such systems adapted for aerial photographic reconnaissance sensing illumination from a plurality of separate zones of the actinic portion of the electromagnetic spectrum, herein used to embrace the ultraviolet, the visible spectrum, and the near infrared.

A typical problem in aerial reconnaissance consists in the detection of vehicles which have been painted to blend with the foliage and may be concealed wholly or in part by cut foliage for purposes of additional camouflaging. Heretofore there have been proposed photograhic reconnaissance systems using spaced zones of the color spectrum to aid in analysis and interpretation of the photographs in accordance with established principles. These systems, in general, have employed commercial multicolor photographic negatives, from which are made ordinary multicolor prints or transparencies. However, such systems have not proved practical for aerial reconnaissance because of the prohibitive length of time for data reduction prior to viewing and evaluation. Such commercial multicolor films require extremely lengthly processing times and complex chemical processing equipment. In addition to the time delay problem, they have not included provisions to permit alteration of the parameters, hue, brightness, and saturation, of the color image by viewer controls operated by the interpreter.

It is an object of the invention therefore, to provide a new and improved spectral-zonal color reconnaissance system which obviates one or more of the above-mentioned disadvantages and limitations of prior systems of this type.

It is another object of the invention to provide a new and improved spectral-zonal color reconnaissance system using a plurality of separate zones of the actinic portion of the electromagnetic spectrum.

It is another object of the invention to provide a new and improved spectral-zonal color reconnaissance system requiring a minimum film processing time, permitting rapid photographic analysis and interpretation.

It is still another object of the invention to provide a new and improved spectral-zonal color reconnaissance system including an optical viewing apparatus capable of evaluating a plurality of spectral-zonal positives in the following manners:

a. Monochrome presentation of individual spectral images for detailed study of the scene characteristics in each zone of the spectrum.

b. Presentation of conventional monochrome panchromatic positives by superposition of red, green, and blue spectral-zonal positives without using color filters in the viewing system.

c. True color presentation utilizing the red, green, and blue spectral-zonal positives in an additive color system.

d. False color (camouflage detection) presentation utilizing arbitrarily selected spectral-zonal positives in an additive color system.

In accordance with the invention, in a spectral-zonal color reconnaissance system there is provided an optical viewing apparatus for evaluating a reconnaissance film including multiple images of a common scene which have been exposed primarily to separated zones of the actinic electromagnetic spectrum, comprising means for illuminating the film images individually with white lights, means for selectively making effective any one or more of the illuminating means, means for altering the relative intensities of illumination of the viewed images, and optical means for displaying the selected illuminated images for evaluation.

Further in accordance with the invention, in a spectral-zonal color reconnaissance system there is provided an optical viewing apparatus for evaluating a reconnaissance film including multiple images of a common scene which have been exposed primarily to separated zones of the actinic electromagnetic spectrum comprising means for illuminating the film images individually with lights of substantially the same chromaticities as their respective exposing spectra or with lights of chromaticities substantially different therefrom, means for selectively making effective any one or more of the illuminating means, and optical means for displaying the selected illuminated images for evaluation.

For a better understanding of the present invention, together with other and further objects thereof, reference is had to the following description, taken in connection with the accompanying drawings, while its scope will be pointed out in the appended claims.

Figure 2:
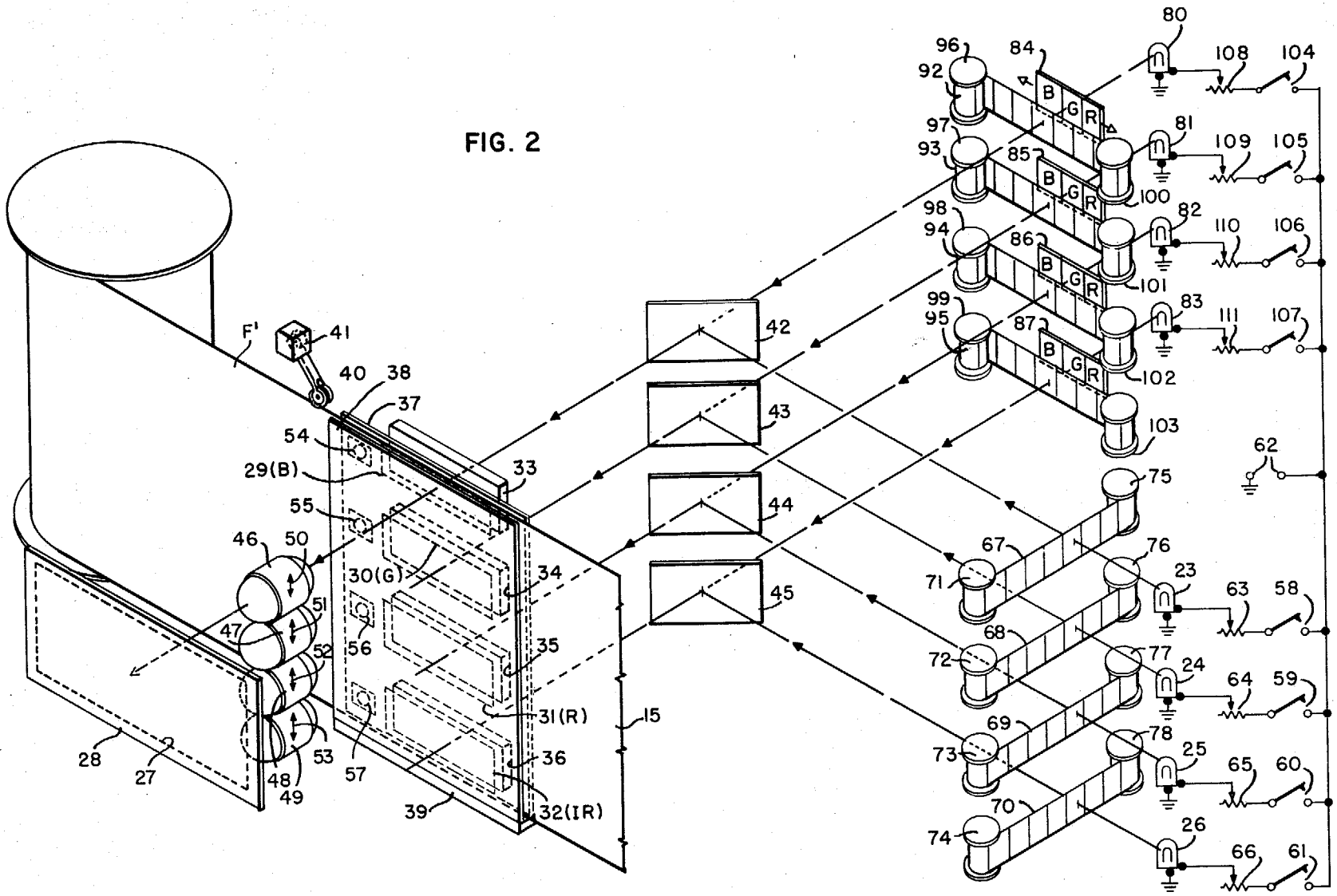

Referring now to the drawings:

FIG. 1 is a perspective schematic view of a spectral-zonal color camera for use in the system of the invention, while FIG. 2 is a schematic perspective view of an optical viewing apparatus for use in the system of the invention.

Referring more particularly to FIG. 1 of the drawings, there is represented a camera means for use in a spectral-zonal color reconnaissance system embodying the invention. This camera includes means for individually exposing, in precise relative positions, discrete portions of a photosensitive film to a common scene by illumination of separated zones of the actinic electromagnetic spectrum to form multiple images thereon. Specifically, the camera of FIG. 1 includes four lens-filter combinations 11–14 designed individually to transmit radiation from the scene corresponding to any four zones of the actinic electromagnetic spectrum from ultraviolet through near infrared. For example, lens-filter combination 11 may transmit energy in the blue region from 4,000 to 5,200 A.; lens-filter combination 12 in the green region from 4,800 to 6,100 A.; lens-filter combination 13 in the red region from 5,900 to 7,100 A.; and lens-filter combination 14 in the infrared region from 7,100 to 9,000 A. These restrictions in spectral bandwidths can be accomplished by the use of standard commercial Wratten filters Nos. 47, 58B, 25, and 89B, respectively, although other filters may be used in applications where different spectral transmission bands are desired. Since the lens-filter combinations 11, 12, and 13 have transmission characteristics overlapping that of the infrared combination 14, an infrared cutoff filter is preferably included in each of the units 11, 12, and 13.

The camera represented in FIG. 1 is of the stationary film, moving lens, panchromatic type illustrated by way of example. It will be apparent, however, that other well-known types of aerial cameras may be employed such as the moving film panchromatic and frame and strip cameras. In the camera of FIG. 1, a strip of film F passes from a supply spool 16 to a takeup spool 17 via a cylindrical vacuum platen 15. With such an arrangement, the lens-filter combinations 11, 12, 13, and 14 are mounted on a support 18 and mounted for oscillation about a pivotal shaft 19 disposed coaxially with the cylindrical platen 15 for panoramic scanning. The lens-oscillating mechanism may be of conventional type and is omitted from the drawing for the sake of clarity.

In order to aid in accurate registration of positives made from images on the film F, there is provided a reference flange or surface 20, against which the film is lightly indexed by means of a roller 21 mounted on a light spring 22. In contrast to the elaborate processing required in making multicolor positive prints or transparencies from a multicolor exposed negative, the latent images on the exposed monochrome film F may be developed in situ, using any of a number of available techniques such as a saturated hydrophyllic layer, a porous plastic web, or conventional wet processing. The time required in processing such a positive transparency is a small fraction of that for processing multilayer color films.

Referring now to FIG. 2 of the drawings, there is represented an optical viewing apparatus for evaluating a reconnaissance film, such as a transparency F′ printed from a negative exposed by the camera of FIG. 1 and including multiple images of a common scene which have exposed to separate zones of the actinic electromagnetic spectrum. Considering first the evaluation of the positive transparencies by a monochrome presentation of individual spectral positives, which may be the visible parts of the spectrum red, green, blue, for detailed study of the characteristics in each band, the apparatus of FIG. 2 includes means such as a plurality of white light sources 23–26 for illuminating film images individually with white lights.

To this end, the apparatus of FIG. 2 consists essentially of four individual projection systems which are arranged in a close vertical array within an appropriate lens angle such that all of the projected photographs lie in accurate registration, forming a composite image 27 on a viewing screen 28. To this end, blue, green, red, and infrared photo images or transparencies 29–32 on the same film strip F′ are fed into the object plane of projection lenses 46–49 and illuminated by the condensing lenses 33–36, being accurately positioned by means of a transparent backing plate 37 and a closely spaced transparent front plate 38. The lower edge of the film F′ engages a reference surface 39 which is in the same relative position to the film strip F′ as the reference surface 20 to the film negative F in the camera of FIG. 1. A roller 40, indexed by a light spring 41, engages the upper edge of the film F′ to maintain the lower edge in alignment with the references surfaces 39.

The transparencies 29–32 are illuminated by the light sources 23–26 via beam splitters such as half-silvered mirrors 42–45, respectively, which reflect the light from the sources 23–26 onto the transparencies through the condensing lenses 33–36. The condensing lenses 33–36 illuminate the transparencies 29–32 at the object planes of projection lenses 46–49, respectively, which, in turn, project the images in superposed relation to form the composite image 27 on the viewing screen 28.

Slight misregistration of the several images in the vertical direction at the viewing screen 28, due to differential shrinkage along the film width, may be compensated by vertically adjusting the positions of the projection lenses 46–49 by means of mechanisms indicated schematically at 50–53, respectively. The registration adjustments may be observed directly in the image 27 on the viewing screen 28. Further to assist in securing accurate registration of the component images in the composite image 27, index marks such as the marks 54–57 are placed on the film strip F in the camera during exposure and reproduced on the positive film F′ adjacent the respective images 29–32. Any small registration corrections required may be effected by rotating the film guide 37–38–39 slightly in the X–Y plane by a mechanism not shown.

In order to provide for interpretation and evaluation of the projected zones of the actinic electromagnetic spectrum such as red, green, blue, and infrared images individually or in any selected combination, the optical viewing apparatus of FIG. 2 includes means for selectively making effective any one or more, for example a selected pluality, of the illuminating sources 23–26. This means may take the form of a series of manually operated switches 58–61, respectively, connected to energize the light sources from suitable supply terminals 62 through adjustable resistors 63–66, respectively.

The optical viewing apparatus of FIG. 2 further comprises means for altering the relative intensities of illumination of the images formed by the light sources 23–26. This adjustment of illumination in intensity may be, in part, effected by the adjustable resistors 63–66, but preferably is effected by a plurality of graduated-density filters 67–70 individually disposed in operative relation to the light sources 23–26, respectively. Each of the filters 67–70 comprises a series of discrete standardized neutral density wedges by means of which the illumination of the images can be varied in predetermined steps. The filters 67–70 are shown in strip form mounted between feed spools 71–74 and takeup spools 75–78, respectively, which spools may be wound and unwound by conventional means not shown.

For conventional multispectral analysis, each spectral-zonal image is viewed individually by selectively closing the switches 58–61, the operator making note of the achromatic tonal characteristics peculiar to an area of interest. In this mode for example, the red spectral-zonal image 31 may be analyzed by closing switch 60, energizing light source 25, which illuminates the image 31 via the beam splitter 44 and the condensing lens 35. The image 31 thus illuminated is projected onto the viewing screen 28 by means of the projector lens 48. In a similar manner, the individual green and blue spectral-zonal images may be analyzed, in turn, by selective operation of the switches 58 and 59, respectively, energizing the light sources 23 and 24.

A standard black-and-white camouflage detection is available by deenergizing all light sources 23–25 and closing switch 61 to energize the light source 26. The resultant image of 32 on screen 28 represents, in this particular example, the radiation emitted from the scene in the infrared spectral zone.

A conventional black-and-white display, similar to that of a panchromatic photograph, can be obtained by the addition of the spectral-zonal images 29–31 by energizing the light sources 23–25 through their respective switches 58–60. The zonal images 29–31 are then projected through their respective lenses 46–48 onto the screen 28. By aligning the fiducial marks 54–56 and adjusting the projection lenses 46–48, as described above, the images on the screen 28 of the three spectral-zonal film images 29–31 may be brought into accurate registration at the screen 28. The resulting image is similar to that taken by a single lens camera using a panchromatic film. By adjusting the neutral density film strips 67–69 adjacent the light sources 23–25, respectively, the brightness of the individual spectral-zonal images 29–31 may be varied selectively without changing the color temperature of the lamps. The neutral density strips 67–70 may comprise a series of discrete portions with incremental density variations of 0.05.

The optical viewing apparatus of FIG. 2 also includes provisions for evaluating the images 29–31 in true color or false color. To this end, there are provided means for illuminating the film images 29–31 individually with lights through filters of substantially the same chromaticities as the original filters in the camera or, alternatively, with lights through filters of chromaticities substantially different from the original filters in the camera. This means comprises a plurality of light sources 80–83 and a plurality of spectral filters associated therewith such as the red, green, and blue filter groups 84–87, respectively, the order of the red, green, and blue filters in the several groups being transposed from group to group. These filters are individually mounted adjacent to the light sources 80–83 and, in one mode of operation, have transmission characteristics substantially the same as th taking filters of the images 29–31, respectively. It should be noted that no infrared filter is used in projection since infrared radiation is not visible to the operator looking at viewing screen 28. Filter belts 84–87 are movably mounted so that, by selectively translating the various filters, the filter associated with any given spectral-zonal image will have a transmission characteristic of the same chromaticity as the taking filter in the camera or one differing therefrom.

The optical viewing apparatus of FIG. 2 further comprises means for making effective to a desired degree any one or more, for example a selected plurality, of the light sources 80–83. This includes means for altering the relative intensities of illumination of the images 29–32 without altering their relative chromaticities, for example, a plurality of neutral density filters 92–95 individually disposed adjacent the light sources 80–83, respectively. These filters may be of the same general type as the neutral density filters 67–70, successive discrete portions thereof varying in density by increments of 0.05.

The apparatus further comprises means for individually adjusting the filters relative to the light sources to alter the relative intensities of the illumination of the images 29–32. This adjustment may be made by mounting the filters 92–95 on feed spools 96–99 and takeup spools 100–103, respectively. The images 29–32 can be selectively illuminated singly or in desired combinations by energizing the light sources 80–83 from the supply terminal 62 through manually operable switches 104–107, respectively, via adjustable resistors 108–111, respectively. The resistors 108–111 may be used to adjust the relative intensity of illumination of the several images 29–32, but preferably these are used for set-up purposes to ensure equal illuminations under reference conditions and the illumination of the several images for evaluation is varied by adjustment of the neutral density filters 92–95.

In making a true color evaluation of a scene, the light sources 80–82 are energized by closing their respective switches 104–106, the light from the sources 80–82 passing through the neutral density filters 92–94 and the color filters 84–86, respectively. For true color evaluation, the neutral density filters 92–94 are adjusted for equal attenuation. The light from the sources 80–82 passes through the beam splitters 42–44, the condensing lenses 33–35, the film images 29–31, and the projection lenses 46–48, which combine them to form a composite true color image 27 on the screen 28 by conventional color addition. The overall color appearance of the composite image may be adjusted by selectively adjusting the neutral density filter strips 92–94, which modifies the relative intensities of illumination of the blue, green, and red images 29–31, respectively.

For example, in a scene which has been photographed at a reasonably low sun angle, the surrounding terrain is cast in a pink or reddish color. By increasing the neutral density in front of the red filter 86, the amount of illumination on the red spectral image 31 is decreased and the resultant image on the screen can be made to appear in more natural color balance. Any desired color balance may be achieved by appropriate selection of the neutral density filters in association with the several light sources 80–82.

In some reconnaissance work, it is desired to project the spectral-zonal images 29–32 in false colors. For example, by illuminating the red, green, and infrared spectral-zonal images 30, 31, and 32 with green, blue, and red illuminations, respectively, the resultant composite image 27 on the viewing screen 28 will be a false color image. The shift in dominant hue resulting from this transposition of the filters is necessary because the infrared taking filter in the camera does not transmit in the visible region of the electromagnetic spectrum. As in true color presentation, the color camouflage detection images are illuminated at full saturation. However, for purposes of target detection, the several images may be selectively desaturated, as described hereinafter.

As stated above, the spectral filters 84–87 associated with the light sources 80—83 are readily interchangeable, not only for the purpose of displaying false color, as described, but also to increase the ability of the observer to detect small differences in chromaticity. For example, it is a known psychophysical fact that the noticeability of chromatic differences is much more acute in the blue and red regions of the spectrum than in the green region. Therefore, if a given scene in true color exhibits a predominant green hue, small chromatic differences in the target and surrounding objects may not be detectable in a true color presentation. By interchanging the green and blue spectral filters 84 and 85, the resulting composite image 27 will have a blue cast and existing differences in chromaticities in the different areas of the scene are more readily discernible.

An example of the aid of transposition of colors is a camouflage-painted vehicle. Such a camouflage-painted vehicle and cut foliage applied to it or surrounding it absorb infrared radiation while the living deciduous foliage in the background reflects infrared radiation. Therefore, a large image contrast between the target and its environment will exist in the infrared spectral-zonal image. By projecting the infrared image as red, the red image as green, and the green image as blue, a vivid chromatic difference will occur in the composite image between the vehicle, its surrounding cut foliage, and the living deciduous background foliage. This color difference renders target recognition much more reliable and much quicker than is possible by former reconnaissance systems.

A completely saturated image does not always contribute to optimum evaluation of certain types of targets so that it is often advantageous partially to desaturate the color representing certain major areas of the spectral zone, while maintaining the saturation of the areas of interest unaltered. This result may be achieved by simultaneously and selectively making effective any one or more of the white light sources 23–26 and the chromatic light sources 80–83 by selective operation of the switches 58–61 and 104–107. The correct amount of desaturation of any color is dependent upon the over-all scene brightness and the spectral reflectivity of the target as well as its surrounding environment. The amount of desaturation may be varied by adjusting the neutral density filters 67–70 adjacent to the white light sources 23–26, respectively.

A spectral-zonal color reconnaissance system embodying the invention has a wide range of applications, among which may be mentioned the following in which advantages are particularly realized:

1. Rapid screening of large volumes of reconnaissance data.
2. Camouflage detection.
3. Mine detection and location.
4. Bomb damage assessment.
5. Counter insurgency.
6. Image enhancement.
7. Airborne photo data reduction.
8. Geological reconnaissance.
9. Planimetric data compilation.
10. Detailed technical analysis of strategic targets.
11. Crop analysis.
12. Rescue operations.
13. Parachute drop support.
14. Antisubmarine warfare.
15. Ocean surveillance.
16. Oceanographic research.
17. Forest survey.
18. Biological, chemical warfare.
19. Land use surveys.
20. Amphibious reconnaissance.
21. Battlefield surveillance for change detection.
22. Semi-automatic photo interpretation.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

I claim:

1. A method of remote sensing comprising the steps of forming a plurality of photographic images of a common scene overflown by an airplane or satellite or the like by exposure of different film portions respectively primarily to different zones of the actinic electromagnetic spectrum;

developing said images;

illuminating the several developed film images individually with lights of selected chromaticities, the chromaticity of the light illuminating at least one of said developed images being substantially different from the chromaticity associated with the corresponding exposing spectral zone for that image;

simultaneously displaying the illuminated developed images in registration for evaluation; and individually varying the brightness of the contributions of the several developed images to the display resulting in contrasts, (of differences), from which information about the scene may be easily discerned.

2. A method according to claim 1 comprising the further step of individually varying the saturation of the contributions of the several developed images to the display.

3. A method according to claim 1 wherein all of said images are formed on a single strip of film in precise relative positions with respect to each other and with respect to the film, whereby the display of the illuminated developed images in registration is facilitated.

4. A method according to claim 1 further comprising the steps of forming all of said images on a single strip of film in precise relative positions with respect to each other, and indexing the film strip during exposure thereof and also during the display of the illuminated developed images to reference positions, whereby the display of the illuminated developed images in registration is facilitated.

5. A method according to claim 1 further comprising the steps of forming all of said images on a single strip of film in precise relative positions with respect to each other, and forming a plurality of index marks on the film in precise relative positions with respect to said images, whereby the display of the illuminated developed images in registration is facilitated.

6. In a remote sensing system, an optical viewing apparatus for evaluating a reconnaissance film including multiple photographic images of a common scene overflown by an airplane or satellite or the like, the images being respectively exposed primarily to separated zones of the actinic electromagnetic spectrum comprising:

means for illuminating the film images individually with white lights;

additional means for illuminating the film images individually with lights of substantially the same chromaticities as their respective exposing spectra;

means for selectively making effective any one or more of said illuminating means;

means for individually varying the brightness of said lights; and optical means for displaying the selected illuminated images for evaluation.

7. In a remote sensing system, an optical viewing apparatus for evaluating a reconnaissance film including multiple photographic images of a common scene overflown by an airplane or satellite or the like, the images being respectively exposed primarily to separated zones of the actinic electromagnetic spectrum comprising:

means for illuminating the film images individually with white lights;

additional means for illuminating the film images individually with lights of substantially the same chromaticities as their respective exposing spectra;

means for selectively making effective any one or more of said white light illuminating means;

means for selectively making effective any one or more of said chromatic illuminating means simultaneously with illumination by said white light illuminating means;

means for individually varying the brightness of said lights; and optical means for simultaneously displaying the selected illuminated images for evaluation.

*8. A method of remote sensing comprising the steps of*

*forming at least four photographic images of a common scene overflown by an airplane or satellite or the like by exposure of different film portions on a single strip of film in precise relative positions with respect to each other respectively primarily to different zones of the actinic electromagnetic spectrum, at least one of the photographs being in the non-visible region of said spectrum;*

*developing said images;*

*illuminating the said developed film images individually with lights of selected chromaticities, each chromaticity selected being a portion of the visible spectrum and not white light, the chromaticity of the light illuminating at least one of said developed images being substantially different from the chromaticity associated with the corresponding exposing spectral zone for that image;*

*simultaneously displaying the illuminated developed images in registration for evaluation in an optical viewing apparatus having at least four projection means, said evaluation being based upon objectively measurable color; and*

*individually varying the brightness of the contributions of several of the developed images to the display resulting in contrasts (or differences) from which information about the scene may be easily discerned.*

*9. A method of remote sensing comprising the steps of*

*forming at least four photographic images of a common scene overflown by an airplane or satellite or the like by exposure of different film portions respectively primarily to different zones of the actinic electromagnetic spectrum, at least one of the photographs being in the non-visible region of said spectrum;*

*developing said images;*

*illuminating the said developed film images individually with lights of selected chromaticities, each chromaticity selected being a portion of the visible spectrum and not white light, the chromaticity of the light illuminating at least one of said developed images being substantially different from the chromaticity associated with the corresponding exposing spectral zone for that image;*

*simultaneously displaying the illuminated developed images in registration for evaluation in an optical viewing apparatus having at least four projection means, said evaluation being based upon objectively measurable color; and*

*individually varying the brightness of the contributions of several of the developed images to the display resulting in contrasts (of differences) from which information about the scene may be easily discerned.*

*10. In a remote sensing system, an optical viewing apparatus for evaluating a reconnaissance film including at least four photographic images of a common scene overflown by an airplane or satellite or the like, the images being exposed primarily to separated zones of the actinic electromagnetic spectrum comprising:*

*means for illuminating the film images individually with white lights;*

*additional means for simultaneously illuminating at least three of the film images individually with lights of substantially different chromaticities from their respective exposing spectra, which chromaticities are different portions of the visible spectrum;*

*means for selectively making effective any one or more of said illuminating means;*

*means for individually varying the brightness of said lights; and*

*optical means having at least four projection means for displaying the selected illuminated images for evaluation.*

* * * * *